US011525754B2

(12) United States Patent
Lampe-Juergens et al.

(10) Patent No.: US 11,525,754 B2
(45) Date of Patent: Dec. 13, 2022

(54) LEAK DETECTION SYSTEM AND METHOD

(71) Applicant: Honeywell International Inc., Morris Plains, NJ (US)

(72) Inventors: Christian Lampe-Juergens, Spelle (DE); Ralf Schroeder genannt Berghegger, Glandorf (DE); Andreas Wuchrer, Georgsmarienhuette (DE); Tobias Meimberg, Osnabrueck (DE); Norbert Flerlage, Loeningen (DE); Guido Temme, Bad Iburg (DE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 154 days.

(21) Appl. No.: 16/949,476

(22) Filed: Oct. 30, 2020

(65) Prior Publication Data
US 2022/0136926 A1 May 5, 2022

(51) Int. Cl.
G01M 3/28 (2006.01)
G01D 4/00 (2006.01)

(52) U.S. Cl.
CPC .......... *G01M 3/2815* (2013.01); *G01D 4/004* (2013.01)

(58) Field of Classification Search
CPC .. G01D 4/00; G01D 4/004; G01F 3/00; G01F 3/22; G01F 15/00
See application file for complete search history.

(56) References Cited

U.S. PATENT DOCUMENTS

| | | | | |
|---|---|---|---|---|
| 5,866,802 A * | 2/1999 | Kimata | ............... | G01M 3/2815 431/12 |
| 2021/0010894 A1* | 1/2021 | Fujii | ....................... | G01F 1/662 |
| 2022/0147069 A1* | 5/2022 | Gyoutoku | ................ | G01F 1/66 |

FOREIGN PATENT DOCUMENTS

| CA | 2715934 A1 * | 3/2011 | ............. G01D 4/004 |
|---|---|---|---|
| CN | 203785722 U | 8/2014 | |
| CN | 206248155 U | 6/2017 | |
| DE | 102018007349 A1 * | 3/2020 | ............... G01M 3/26 |
| EP | 3879239 A1 * | 9/2021 | ............... G01F 1/66 |
| JP | 4060719 B2 | 8/2004 | |
| JP | 2009014687 A * | 1/2009 | ............... F17D 5/02 |

* cited by examiner

*Primary Examiner* — Nguyen Q. Ha
(74) *Attorney, Agent, or Firm* — John Maldjian; Stevens & Lee PC

(57) ABSTRACT

The system can include installing a gas meter in a gas supply net. The system may also include determining, by the gas meter, a level of pressure within the gas meter. The system may also include determining, by the gas meter, a flow rate level within the gas meter. The gas meter determines where a leak exists based on the flow rate level and the level of pressure. The system may also include determining, by the gas meter, a location of the leak, and whether the leak is upstream or downstream from the gas meter. The location of the leak is determined by the level of the pressure and the flow rate level. The system can also include a head end configured at a set position. The gas meter can inform the head end of the location of the leak.

18 Claims, 3 Drawing Sheets

LEAK DETECTION SYSTEM AND METHOD

TECHNICAL FIELD

The present disclosure generally relates to a gas meter and a head end in a system. More specifically, the present invention provides a system for a gas meter determining the location of a leak within a system by determining a level of pressure and a flow rate level.

BACKGROUND

Currently, gas meters do not have any integrated net pressure sensors. Conventional gas meters do not have one integrated pressure sensor that can determine the level of pressure within the gas supply or relate a flow rate level to a pressure level. Without the integrated pressure sensors, it would not be possible to measure the net pressure in gas pipes at local positions at the gas meter within a system.

Another drawback is that even if it were possible for gas meters to detect high flow rates, it could not be known as to whether the high flow rates were a result of excessive flow by downstream devices or by broken pipelines downstream. Further, if upstream from the gas meter, the gas pipes are broken and pressure drops below a certain level, then it could be determined as to what gas pipes were broken and to what level the pressure of the gas meter had been reduced to.

Accordingly, there is a need to be able to determine the locations of leaks that can occur upstream or downstream from the gas meter. Leaks that occur downstream from the gas meter can result in an unsafe situation within a house. Similarly, leaks that occur upstream from the gas meter can also result in consequences to one or more gas pipes or to a house within a system.

As such, there is a need for gas meters to be able to determine the location of leaks, whether the location of the leaks is in upstream or downstream the gas meter in a system. The gas meters need to be able to determine the location of the leaks to inform a head end system to where the leaks are located, and thereby enable the head end system to locate help to prevent an unsafe situation from occurring due to the leaks that are involved Therefore, it is imperative to have gas meters in a system that can enable the gas meter to determine the pressure and the flow rate within the gas meter. Further, the gas meters need to have integrated pressure sensors that enable the gas meter to be able to determine the locations of any leaks that occur within the system.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments is to provide an improved determination of determine a location of a leak in the systems and method thereof.

It is another aspect of the disclosed embodiments to provide for a smart meter to be configured to track the level of pressure and the flow rate level in the gas meter.

It is another aspect of the disclosed embodiments to provide a method and system of alerting a head end system of damage or potential damage due to a leak being found upstream or downstream from the gas meter.

The aforementioned aspects and other objectives can now be achieved as described herein. In an embodiment, a method can include installing a gas meter in a gas supply net. The method can also include determining, by the gas meter, a level of pressure within the gas meter. The method may further include determining, by the gas meter, a flow rate level within the gas meter. The gas meter determines where a leak exists based on the flow rate level and the level of pressure. The method may also include determining, by the gas meter, a location of the leak, and if the location of the leak is upstream or downstream from the gas meter. The location of the leak is determined by the level of the pressure and the flow rate level of the gas meter within the gas supply net. The method may also include a head end configured at a set position. The gas meter informs the head end of the location of the leak.

In an embodiment of the method, the location of the leak is downstream when the flow rate level is above a maximum flow rate.

In an embodiment of the method, the location of the leak is upstream when the flow rate level is low or and/or zero and the pressure level is low.

In another embodiment, a system can include a gas meter installed in a gas supply net. The system can also include a pressure sensor configured to determine a rate of pressure within the gas meter. The system may also include a flow tube configured to measure a flow rate within the gas meter. Alternative also other measurement systems e.g. diaphragm gas meter could be used to determine the current flow rate within the gas meter. The ultrasonic sensor assists the gas meter to determine a location of a leak based on the flow rate. The system can also include a head end configured to receive an alarm from the gas meter based on the determined rate of pressure, the measured flow rate, and the location of the leak.

In an embodiment of the system, the gas meter can determine if gas, air or a mixture of gas and air is flowing through the gas meter In an embodiment of the system, the head end provides information about one or more locations of the leak to one or more external sources to enable the one or more external sources to provide assistance to the one or more locations of the leak.

In an embodiment of the system, the gas meter closes an integrated valve based on the detection of the location of the leak.

In an embodiment of the system, the measured flow rate and pressure information allows the gas meter to determine that the location of the leak is downstream.

In an embodiment of the system, the measured flow rate and pressure information allows the gas meter to determine that the location of the leak is upstream.

In an embodiment of the system, the gas meter closes an external valve in response to the leak being detected.

In another embodiment of the system, a gas meter can be configured in a first position in a grid. The system can also within the meter housing configured with a first pressure sensor and a flow tube to measure a pressure and a flow rate of the gas meter within the grid. The system may also include an electronic index coupled with a second pressure sensor. A difference between the first pressure sensor and the second pressure sensor is calculated to determine a current net pressure within the gas meter. The system may also include a head end configured at a set position to receive an alert from an RF communication module. The head end receives the alert from the RF communication module based on a location of a leak being found based on the net pressure and the flow rate of the gas meter.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

Figure 1:
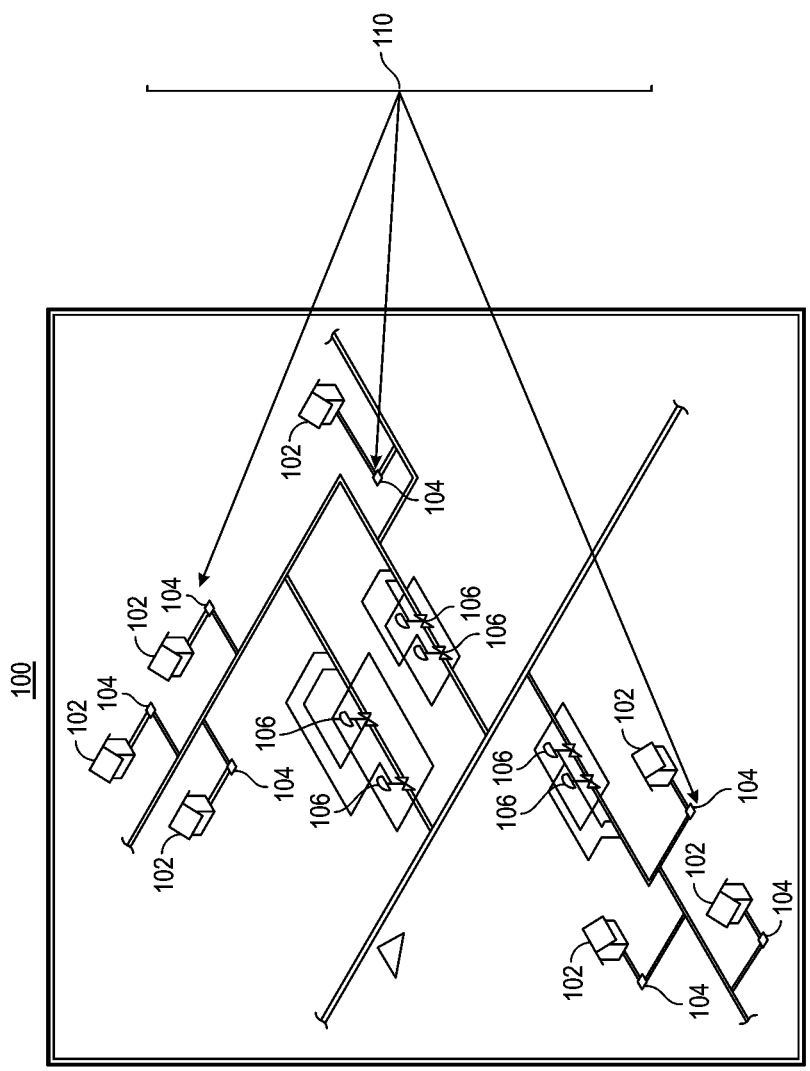
FIG. 1 illustrates a diagram of a system, which can be implemented in accordance with an embodiment.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. IN addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the:, again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc*. v. *H.J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function(s) of the teachings related to any described embodiment of the present invention may be suitably changed by those skilled in the art.

The example embodiments described herein are for broken pipe detection. Aspects of the present invention are described below with reference to flowchart illustrations and/or block diagrams of methods, and systems according to the disclosed embodiments. Each block of the flowchart illustration and/or block diagrams, and combinations of blocks in the flowchart illustrations and/or block diagrams, can be implemented by various means.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

Where the gas meter, pressure and flow rate are described, it will be understood by those of ordinary skill in the art that gas meter, pressure rates, and flow rates alternative to those described may be implemented. Any schematic illustrations of the gas meter and accompanying descriptions of any sample gas meters presented herein are example arrangements for stored representations of information. Embodiments of the invention may also be implemented in one or a combination of systems.

More specifically, as will be appreciated by one skilled in the art, aspects of the present invention may be embodied as a system and/or method. Furthermore, aspects of the present invention may take the form of a plurality of systems to enable gas meter to determine the location of one or more leaks within the system.

INTRODUCTION

Embodiments of the present invention include a system with houses, regulator stations and gas meters. The gas meter can be configured to determine where any leaks can occur within the system. In addition, the gas meter can be configured to determine if the leaks are upstream or downstream from the gas meter. Further, the head end system can use location of the gas meter to determine what pipe or house that the leak may be occurring.

The gas meter is positioned in the system to determine if abnormal situations due to leaks appear, and to see where those leaks are located. To determine the locations of the leaks, the gas meter can determine its pressure rate, and also its flow rate. If the net pressure of the gas meter is e.g. normally at 20 mbar and it is now reduced to e.g. 10 mbar and the flow rate is above the maximum flow rate for the gas meter, then the gas meter can determine that the leak can be downstream from the gas meter. The gas meter can determine that the leak may be in the house that is near the gas meter. If the net pressure of the gas meter is e.g. normally at 20 mbar and it is now reduced to e.g. around 10 mbar or below, and the flow rate is very low or at 0, the gas meter can determine that a leak can exist upstream from the gas meter. In either situation, the gas meter determines that an abnormal situation such as a leak exists, and that an unsafe situation can occur in one of the gas pipes or one of the homes.

In response to the gas meter identifying a leak either upstream or downstream, the gas meter can contact the head end system to notify the head end system of the leak either upstream and/or downstream from the meter. The gas meter can have integrated pressure sensors to determine its net pressure, and to contact the head end system when leaks are present in the system. The pressure sensors can be used to determine an abnormal situation and to alert the head end system of the leak located either upstream and/or downstream from the gas meter. The head end system can then alert an external source such as fire department or police of the leak in order to provide assistance to one or more locations of the leak present in the system.

System Structure

FIG. 1 illustrates a block diagram of a system 100, which can be implemented in accordance with an embodiment. The system 100 can include one or more houses 102. Near each housing 102, a gas meter 104 can be installed. Further, near each gas meter 104 a regulator can be installed (not shown), and upstream from each gas meter 104, regulator stations 106 can be installed. A head end (head end) system 110 can also be present to communicate with the gas meter 104.

Referring to FIG. 1, the gas meter 104 can have two absolute pressure sensors. One of the pressure sensors can be in an electronic index (as will be shown in FIG. 2), while the other pressure sensor can be within the gas meter 104. The gas meter 104 can calculate the pressure different between both sensors to obtain the current net pressure within the gas meter 104. Typically, the net pressure within the gas meter 104 is in the low pressure net of around 20-30 mbar (0,3-0, 45 PSI).

Still referring to FIG. 1, the gas meter 104 can also measure its flow rate. The flow rate can be calculated with the delta time of flight measurement. The gas meter could also calculate the speed of sound by an absolute time of flight measurement. It can be predicted if there is gas or air, or a combination of both gas and air inside the gas meter 104. Moreover, the speed of sound for air is about 340 m/s, while the speed of sound for methane is about 430 m/s. As such, the composition of both air and methane can result in a speed in between these ranges. As such, the gas meter 104 can determine its internal net pressure and also its flow rate. In addition, what type of gas or air is in the gas meter 104 can also be calculated as well.

In FIG. 1, when the gas meter 104 determines its net pressure and flow rate, it determines if an abnormal situation such as a leak exists. The gas meter can determine whether a leak exists by monitoring the level of pressure and the measured flow rate. In an embodiment, when the level of pressure drops below a certain level of pressure (e.g. 10 mbar), and the measured flow rate is above the maximum flow rate for the gas meter 104, the gas meter 104 can determine that such a situation is an abnormal situation, and that a leak can be present in a location. Moreover, the leak is expected to be downstream from the gas meter 104. Moreover, the leak can be in the house 102 near the gas meter 104. In such a situation, the gas meter 104 can close a valve and also inform the head end 110 of the leak downstream.

Referring to FIG. 1, in an embodiment, the gas meter 104 can also have a pressure that is below a certain level of pressure (e.g. 10 mbar), and have a measured flow rate that is either 0 or very low and substantially similar to 0. The gas meter 104 may also identify these measurements to be an abnormal condition. In addition, the gas meter 104 can determine that a leak can also be present upstream from the gas meter 104.

In FIG. 1, no pressure can also occur in case of a gas meter 104 exchange, or a tamper attack, or a ball valve that is upstream from the gas meter 104 can be closed. If this is unexpected, then the meter may inform the head end system. In either embodiments described whether the max flow rate is either too high or too low, the gas meter 104 can send an alarm to the head end 110. In response to receiving the alert from the gas meter 104, the head end can get assistance for the gas meter 104. The head end 110 can relay information to external sources that can assist the gas meter 104. Further, the head end 110 can provide information to external source such as a fire worker, fire department, ambulance and police or any other external sources that can provide immediate assistance to the gas meter 104.

To better understand the gas meter 104, it is important to note the assembly of the gas meter 104. The internal construction of the gas meter 104 can illustrate how the gas meter 104, once installed in the system 100, can take a pressure reading and flow rate measurement of the gas meter 104. In addition, it can also be understood how the gas meter 104 is able to alert the head end 110 once the net pressure and flow rate of the gas meter 104 indicate an abnormal situation, and a leak in an upstream or downstream location from the gas meter 104.

Figure 2:
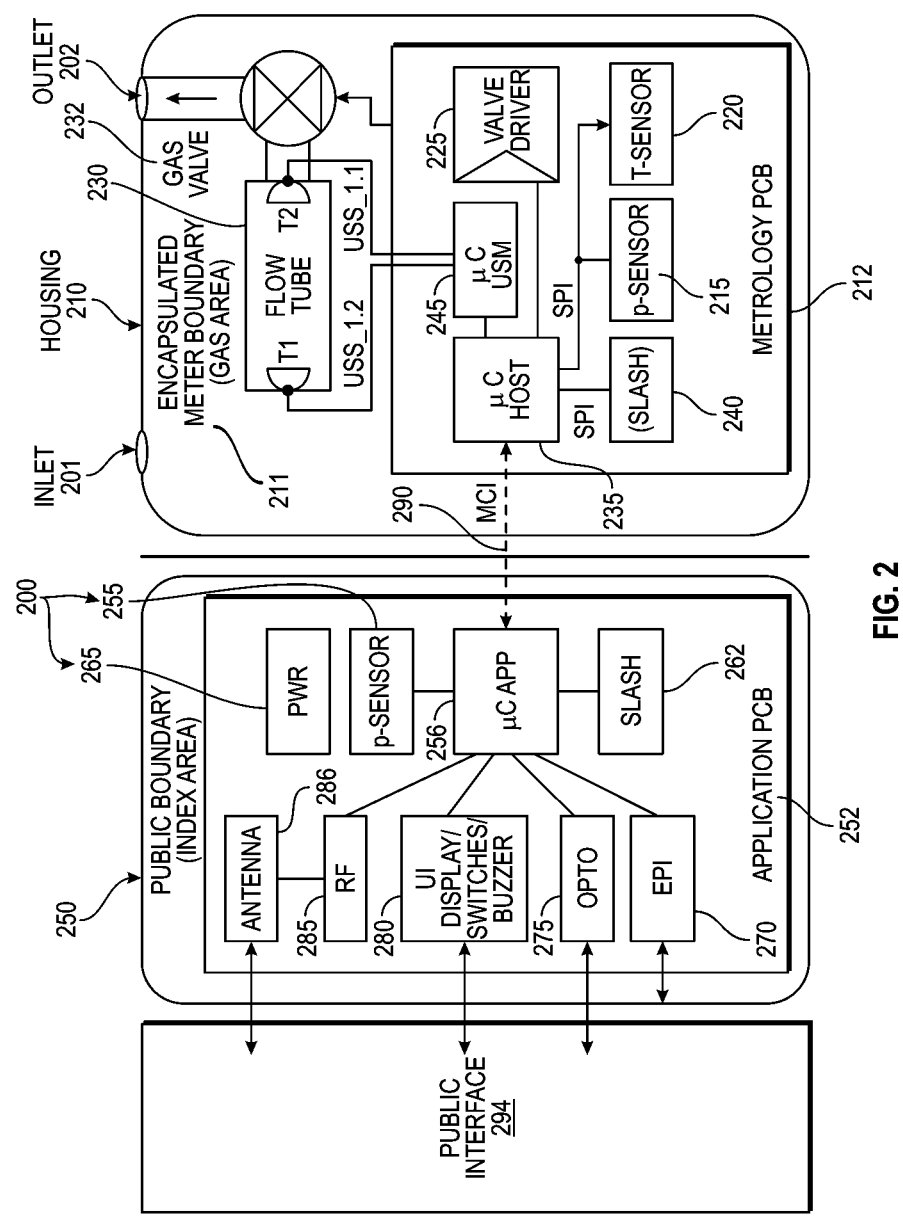
FIG. 2 illustrates a schematic diagram in accordance with an embodiment.

Referring to FIG. 2, a gas meter 200 that can be found in the system of FIG. 1 is illustrated. The gas meter 200 can include meter housing that includes a pressure sensor and a temperature sensor. The gas meter 200 can also include a public boundary/meter index with a second pressure sensor and public interface to communicate with the head end system.

In FIG. 2, the gas meter 200 can include a housing 210. The housing 210 can include an inlet 201, an outlet 202, and an encapsulated meter boundary 211. Within the meter boundary 211, there is a Metrology PCB Board (PCB Board) 212. Within the PCB board 212, there can include a pressure sensor 215. The pressure sensor 215 can be used to measure the absolute+net pressure of the gas meter 200. Next to the pressure sensor 215 is a temperature sensor 220. In addition, a valve driver 225, a µC USM 245, and a µC HOST 235 are illustrated. The flow tube 230 can be used to measure the flow rate for the gas meter 200. A gas valve 232 is situated next to the flow tube 230.

In FIG. 2, a public boundary index area 250 is also illustrated. The index area 250 can include an application PCB board 252. Within the public boundary index area 250, a pressure sensor 255 is configured. The pressure sensor 255 within the index area 250 and the pressure sensor 215 within the meter boundary 211 can be used to calculate the net pressure of the gas meter 200. The difference between the pressure sensor 215 within the meter boundary 210 and the pressure sensor 255 within the index area 250 is the net pressure of the gas meter 200.

In FIG. 2, the index area 250 also includes a slash 262, uc App 256. PWR 265, EPI 270, Opto 275, UI display switches/buzzer 280, RF (communication module) 285, and an antenna 286. A metrology communication interface (MCI) 290 is the interface between the Metrology PCB board 212 in the gas meter 200 and the Application PCB board 252 in the index area 250. Further, the index area 250 is positioned in a public interface 294. The public interface 294 can enable access to the UI display/switches buzzer 280 and RF 285.

Still referring to FIG. 2, the gas meter 200 calculates the net pressure using pressure sensors 215, 255, and the flow rate via the flow tube 230. The gas meter 200 determines whether an abnormal situation exists based on the net pressure and the flow rate. The gas meter 200 attempts to determine if a leak exists upstream or downstream from the gas meter.

In FIG. 2, when the gas meter 200 has a certain level of pressure, such as 10 mbar, and a measured flow rate that is above the maximum flow rate above the gas meter 200, then the gas meter 200 determines that an abnormal situation exists, and that a leak is likely to exist. Further, the leak is expected downstream from the gas meter 200, and possibly in the house that is within the system. In addition, if gas is flowing through the gas meter 200, then the gas meter 200 should automatically close the valve and inform the head end system (shown in FIG. 1) about the leak downstream.

In FIG. 2, when the net pressure in the gas meter 200 drops below a certain level of pressure, such as 10 mbar, and the measured flow rate is 0 or substantially similar to 0, then the gas meter 200 can determine that an abnormal situation occurs. The gas meter 200 can determine that a leak upstream from the gas meter 200 can exist. As such, the gas meter 200 via the RF (communication module) 285 can inform the head end about the leak upstream, and also close the internal valve to ensure that no unsafe situation may occur within the house or one or more gas pipes in the system.

Figure 3:
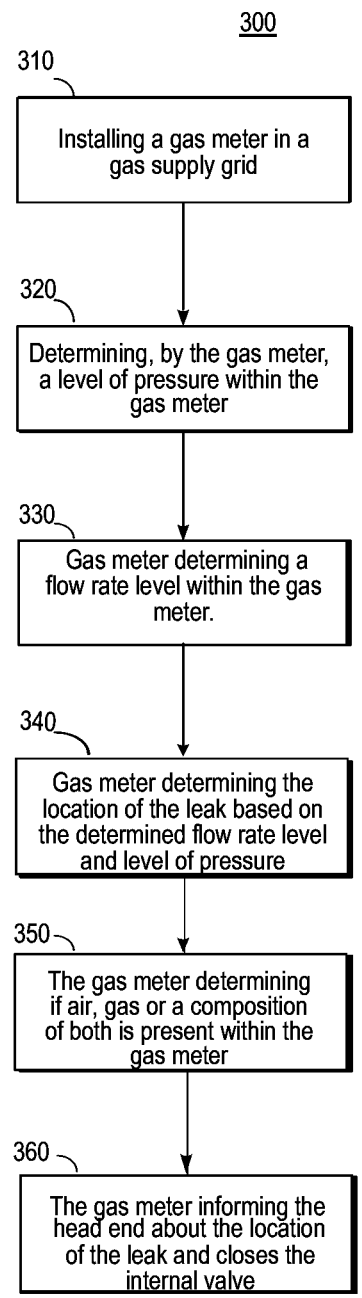
FIG. 3 illustrates a method of determining in accordance with an embodiment.

In FIG. 3, a method 300 of determining an abnormal situation, such as a leak upstream or downstream exists around the gas meter described in FIGS. 1 and 2. At step 310, a gas meter is installed a first position. The gas meter can be installed to measure gas volume and to monitor its net pressure. Its net pressure can be calculated from a first pressure sensor within the gas meter and a second pressure sensor within a meter index. The gas meter can also be configured to monitor its flow rate. The gas meter can use its measured net pressure and flow rate to determine if abnormal situation occurs, such as a leak upstream or downstream from the gas meter, and to determine if it needs to inform a head end system of the leak upstream or downstream. Also it could determine if air or gas is present in the gas meter and could provide this information as well to the head end system for analysis purpose.

In FIG. 3, at step 320, the gas meter can determine the level of pressure, or its net pressure. The gas meter can calculate the difference between the first pressure sensor and the second pressure sensor to obtain the net pressure. The net pressure can be lower, than usual around 10 mbar. The net pressure can enable the gas meter to determine if a leak could possibly exist upstream or downstream from the gas meter. As shown in FIG. 2, the first pressure sensor can be configured in a meter boundary of the gas meter, while the second pressure sensor can be configured within a meter index.

In FIG. 3, at step 330, the gas meter can determine the flow rate level. The gas meter can determine the flow rate level using the ultrasonic sensor tube in the meter boundary described in FIG. 2. The gas meter can determine that the flow rate is above the max flow rate level of the gas meter along with the net pressure being at or around 10 mbar. Due to the net pressure and the flow rate being above the max flow rate of the gas meter, the gas meter can determine that an abnormal situation exits due to the flow rate level. Alternatively, the gas meter can determine that the flow rate is 0 or substantially similar to 0, with the pressure rate being at 10 mbar. In such an instance, the gas meter can also determine that an abnormal situation exits due to the flow rate level.

In FIG. 3, at step 340, the gas meter can determine that an abnormal situation exits due to the net pressure and the flow rate, and that a leak exists. In addition, the gas meter can determine that the leak can be downstream from the gas meter due to the pressure being at 10 mbar and the flow rate being above the maximum flow rate of the gas meter. If the leak is downstream from the gas meter, then the leak can possibly be within the house that is near the gas meter. In the alternative, the gas meter can determine, with the flow rate is 0 or substantially similar to 0 and the net pressure being around 10 mbar or below, that the leak is upstream from the gas meter. In both situations of the leak being upstream or downstream from the gas meter, the gas meter is expected to inform the head end about the leak. Further, if air or a blend of air or gas is detected, then the gas meter can provide this information to the head end system. The integrated valve can be closed to ensure that no unsafe situation occurs in the house near the gas meter.

In FIG. 3, at step 350, the gas meter determines if air, gas, or a combination of air and gas is present within the gas meter. The gas meter can accordingly provide the information to the head end system after the gas meter can successfully determine if it includes air, gas, or a combination of both air and gas.

In FIG. 3, at step 360, the gas meter informs the head end system of the leak that is upstream or downstream from the gas meter. The gas meter determines if an abnormal situation exists due to its current net pressure and flow rate levels. Further, the gas meter determines the location of the leak, which can be either upstream or downstream from the gas meter and if air or gas or a composition of both is in the gas meter present. The gas meter can inform the head end so that the head end can provide assistance. Moreover, the head end can contact external sources for assistance. Such external sources can be a fire worker, an ambulance, or the police that can provide assistance to stop the leak upstream or downstream from the meter. The gas meter can also close an integrated valve in response to the location of the leak.

Those skilled in the art will appreciate that the example embodiments are non-exhaustive and that embodiments other than that described here may be included without departing from the scope and spirit of the presently disclosed embodiments.

Advantages

The smart gas meter along with the head end system within a system can now detect broken gas pipes securely. The gas meter is integrated with a pressure sensor within its meter boundary and its meter index. The difference between the two integrated pressure sensors within the meter boundary and the meter index respectively enables the gas meter to determine the net pressure of the gas meter. With the two pressure sensors, the gas meter is able to determine if the net pressure is around below normal pressure.

Further, the gas meter is configured with an ultrasonic sensor tube within its meter boundary to enable the gas meter to determine its flow rate. Due to the gas meter being able to measure its net pressure with the two pressure sensors and being able to measure its flow rate, the gas meter can determine when the flow rate is above the max level flow rate for the gas meter. In another instance, the gas meter can determine whether the flow rate is low, and is at 0 or near 0.

With the gas meter being able to determine the net pressure and the flow rate, the gas meter is able to determine if an abnormal situation exists. The abnormal situation can be a leak that is either upstream or downstream from the gas meter. When the net pressure is below normal net pressure, and the flow rate is above the maximum flow rate for the gas meter, the leak is expected downstream from the gas meter, and possibly in the house. Alternatively, when the pressure is below normal net pressure and the flow rate is 0 or near 0, the leak is expected upstream from the gas meter.

The head end system is able with the information from the gas meter to determine, from the location of the leak, which single house or gas pipe within the system is affected. In addition, the gas meter is able to determine if excessive flow is happening into a house. The gas meter is also able to determine if the excessive flow is gas or air, or a combination of gas and air. Due to the leak, the gas meter is able to close an integrated valve to prevent an unsafe situation in the house and/or inform the head end system of the leak so that the head end system can provide assistance. The head end can contact external sources such as an ambulance, fire department or police to provide assistance to the one or more locations of the leak, and to prevent an unsafe situation from occurring.

The disclosed embodiments can offer technical improvements to identifying abnormal situations with gas meters. In addition, the disclosed embodiments can assist in specifically determining the locations of one or more leaks. The specific pipe and/or house that the leak is occurring can be identified. In addition, the disclosed embodiments can more efficiently enable the gas meter to alert the head end system of the leak/leaks, and enable the head end system to obtain assistance to prevent unsafe situations from occurring due to the presence of the leak/leaks. Also the meter is able to determine if in the meter is gas or air, or a combination of gas and air.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

The invention claimed is:

1. A method comprising:
   installing a gas meter in a gas supply net;
   determining, by the gas meter, a level of pressure within the gas meter;
   determining, by the gas meter, a flow rate level within the gas meter, wherein the gas meter determines if a leak exists based on the flow rate level, and the level of pressure;
   determining, by the gas meter, if a location of the leak is upstream or downstream from the gas meter; and
   a head end configured at a set position, wherein the gas meter informs the head end of the location of the leak.

2. The method of claim 1, wherein the location of the leak is downstream when the flow rate level is above a maximum flow rate and the level of pressure is lower than normal.

3. The method of claim 1, wherein the location of the leak is upstream when the flow rate level has decreased and the level of pressure is lower than normal.

4. The method of claim 1, further comprising:
   determining, by the gas meter, whether the gas meter is used in air, gas, or a composition of both.

5. The method of claim 1, further comprising:
   determining, by the gas meter, whether the level of pressure is above an expected level and wherein the gas meter informs the head end of an abnormal high level of pressure.

6. The method of claim 1, further comprising:
   determining, by the gas meter, whether the level of pressure is above an expected level wherein the gas meter will close an integrated valve in case of an abnormal situation.

7. A system comprising:
   a gas meter installed in a gas supply net;
   a pressure sensor outside the gas meter and a pressure sensor inside the gas meter configured to determine a rate of pressure within the gas meter;
   an flow tube configured to measure a flow rate within the gas meter, wherein the flow tube assists the gas meter to determine a location of a leak based on the rate of pressure and the flow rate, and
   a head end configured to receive an alarm from the gas meter based on the determined rate of pressure, the measured flow rate, and the location of the leak, wherein the gas meter determines if the gas meter is used in air, gas or a mixture of gas and air.

8. The system of claim 7, wherein the gas meter is configured to inform the head end of an abnormal situation.

9. The system of claim 7, wherein the head end provides information about the one or more locations of leaks to one or more external sources to enable the one or more external sources to provide assistance to the one or more locations of leaks.

10. The system of claim 7, wherein the gas meter closes an integrated valve based on the location of the leak.

11. The system of claim 7, wherein the measured flow rate and level of pressure allows the gas meter to determine that the location of the leak is downstream.

12. The system of claim 7, wherein the measured flow rate and level of pressure allows the gas meter to determine that the location of the leak is upstream.

13. The system of claim 7, wherein the gas meter closes an external valve in response to the leak being detected.

14. A system comprising:
   a gas meter configured in a gas supply grid;
   a meter housing configured with a first pressure sensor and a flow tube to measure a pressure and a flow rate of the gas meter within the grid;
   an electronic index coupled with a second pressure sensor, wherein a difference between the first pressure sensor and the second pressure is calculated to determine a current net pressure within the gas meter; and
   a head end configured to receive an alert from an RF communication module, wherein the head end receives the alert from the RF communication module based on a location of a leak being found based on the net pressure and flow rate of the gas meter,
   wherein the gas meter determines whether the leak is upstream or downstream from the gas meter based on the flow rate and level of pressure information of the gas meter.

15. The system of claim 14, wherein the gas meter informs the head end when the flow rate rises past a maximum flow rate of the gas meter.

16. The system of claim 14, wherein the gas meter determines that an abnormal situation has occurred when the flow rate rises past a maximum flow rate of the gas meter.

17. The system of claim 14, wherein the gas meter is configured to close an internal valve when the gas meter determines that there is a leak that is upstream or downstream from the gas meter.

18. The system of claim 14, wherein the gas meter is configured to close an internal valve in response to the leak being a combination of air and gas to prevent any potential damage to a house or environment within the system.

* * * * *